(12) United States Patent
Raz et al.

(10) Patent No.: US 12,493,471 B2
(45) Date of Patent: *Dec. 9, 2025

(54) OPTIMIZING EXECUTION OF CODE ON RECONFIGURABLE HARDWARE USING LIKELY DATA VALUES BASED ON DATA SAMPLING

(71) Applicant: Next Silicon Ltd, Givatayim (IL)

(72) Inventors: Elad Raz, Ramat Gan (IL); Ilan Tayari, Tzur Hadassa (IL)

(73) Assignee: Next Silicon Ltd, Givatayim (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/908,577

(22) PCT Filed: Jan. 11, 2022

(86) PCT No.: PCT/IL2022/050036
§ 371 (c)(1),
(2) Date: Sep. 1, 2022

(87) PCT Pub. No.: WO2022/149145
PCT Pub. Date: Jul. 14, 2022

(65) Prior Publication Data
US 2023/0342157 A1    Oct. 26, 2023

Related U.S. Application Data

(63) Continuation-in-part of application No. 17/145,490, filed on Jan. 11, 2021, now Pat. No. 11,294,686.

(51) Int. Cl.
*G06F 9/38* (2018.01)
(52) U.S. Cl.
CPC .......... *G06F 9/3861* (2013.01); *G06F 9/3804* (2013.01)

(58) Field of Classification Search
CPC .... G06F 9/3804; G06F 9/3832; G06F 9/3844; G06F 9/3861
See application file for complete search history.

(56) References Cited

U.S. PATENT DOCUMENTS 5,909,573 A * 6/1999 Sheaffer ................ G06F 9/3806
712/240
7,130,991 B1 * 10/2006 Butler .................... G06F 9/3844
712/233

(Continued)

OTHER PUBLICATIONS

Final Official Action Dated May 24, 2021 from the US Patent and Trademark Office Re. U.S. Appl. No. 17/145,490. (22 pages).
International Search Report and the Written Opinion Dated Apr. 26, 2022 From the International Searching Authority Re. Application No. PCT/IL2022/050036. (15 Pages).
Interview Summary Dated Aug. 6, 2021 from the US Patent and Trademark Office Re. U.S. Appl. No. 17/145,490. (2 pages).

(Continued)

*Primary Examiner* — Jacob Petranek

(57) ABSTRACT

An apparatus for computing, comprising a processing circuitry configured for computing an outcome of executing a set of computer instructions comprising a group of data variables, by: identifying an initial state of the processing circuitry; executing a set of anticipated computer instructions produced based on the set of computer instructions and a likely data value, where the likely data value is a value of one the group of data variables anticipated to be computed by executing the set of computer instructions and computed using at least one program data value; and when identifying, while executing the set of anticipated computer instructions, a failed prediction where the data variable is not equal to the likely data value: restoring the initial state of the processing circuitry; and executing a set of alternative computer instructions, produced based on the set of computer instructions and the at least one likely data value.

28 Claims, 8 Drawing Sheets

(56) References Cited

U.S. PATENT DOCUMENTS

| | | | |
|---|---|---|---|
| 2003/0110366 A1 | 6/2003 | Wu | |
| 2005/0278513 A1* | 12/2005 | Aristodemou | G06F 9/3816 712/240 |
| 2006/0085591 A1* | 4/2006 | Kumar | G06F 9/30043 711/113 |
| 2011/0264898 A1* | 10/2011 | Chaudhry | G06F 9/30087 712/228 |
| 2015/0095625 A1* | 4/2015 | Hassanein | G06F 8/4441 712/226 |
| 2016/0004534 A1* | 1/2016 | Padmanabha | G06F 9/384 712/229 |
| 2017/0083338 A1 | 3/2017 | Burger et al. | |
| 2017/0153893 A1 | 6/2017 | Gellerich et al. | |
| 2020/0057643 A1* | 2/2020 | Bouzguarrou | G06F 9/3842 |
| 2020/0065111 A1 | 2/2020 | Bouzguarrou et al. | |
| 2020/0082280 A1* | 3/2020 | Orion | G06F 12/0862 |
| 2020/0201646 A1 | 6/2020 | Thompto et al. | |
| 2021/0335431 A1* | 10/2021 | Choi | G11C 16/08 |

OTHER PUBLICATIONS

Notice of Allowance Dated Dec. 16, 2021 from US Patent and Trademark Office Re. U.S. Appl. No. 17/145,490. (5 pages).

Official Action Dated Mar. 10, 2021 From the US Patent and Trademark Office Re. U.S. Appl. No. 17/145,490. (21 Pages).

International Preliminary Report on Patentability Dated Jul. 20, 2023 From the International Bureau of WIPO Re. Application No. PCT/IL2022/050036. (11 Pages).

Communication Pursuant to Article 94(3) EPC Dated Apr. 24, 2024 From the European Patent Office Re. Application No. 22703722.3 (10 Pages).

Invitation to Respond to Written Opinion, Search Report and Written Opinion Dated Oct. 8, 2024 From the Intellectual Property Office of Singapore, IPOS Re. Application No. 11202305295Q. (10 Pages).

Written Opinion Dated Aug. 19, 2025 From the Intellectual Property Office of Singapore, IPOS Re. Application No. 11202305295Q. (7 Pages).

\* cited by examiner

OPTIMIZING EXECUTION OF CODE ON RECONFIGURABLE HARDWARE USING LIKELY DATA VALUES BASED ON DATA SAMPLING

RELATED APPLICATIONS

This application is a National Phase of PCT Patent Application No. PCT/IL2022/050036 having International filing date of Jan. 11, 2022, which is a Continuation-In-Part (CIP) of U.S. patent application Ser. No. 17/145,490 filed on Jan. 11, 2021, now U.S. Pat. No. 11,294,686. The contents of the above applications are all incorporated by reference as if fully set forth herein in their entirety.

BACKGROUND

Some embodiments described in the present disclosure relate to executing computer instructions and, more specifically, but not exclusively, to improving performance of a processing circuitry executing a set of computer instructions.

As used herein, the term "processing unit" is used to mean any kind of programmable or non-programmable circuitry that is configured to carry out a set of operations. A processing unit may comprise hardware as well as software. For example, a processing unit may comprise one or more processors and a transitory or non-transitory memory that carries a program which causes the processing unit to perform the respective operations when the program is executed by the one or more processors.

There is a growing need for high performance processing units. Two common metrics used to measure a processing unit's performance are latency and throughput. Latency is an amount of time it takes a processing unit to perform an identified operation. Some examples of an identified operation are delivering a data packet from a source to a destination, and executing an identified set of computer instructions in response to an input value. Throughput is an amount of identified operations the processing unit performs in a time interval, for example an amount of data packets delivered during the time interval. Another example of a system's throughput is an amount of input values for which the processing unit executes the identified set of computer instructions in the time interval.

For brevity, henceforth, unless otherwise stated, the term "instruction" is used to mean a "computer instruction" and the terms are used interchangeably. In addition, the term "pipeline" is used to mean "instruction pipeline" and the terms are used interchangeably.

There exist a variety of methods for improving a processing unit's performance. Some methods increase throughput; others decrease latency. Some methods both increase throughput and reduce latency, although there is usually a tradeoff between the two metrics.

Some methods improve a processing unit's performance by using instruction pipelining to introduce a degree of parallel processing within the processing unit. In a processing unit implementing an instruction pipeline, an instruction is divided into a group of sequential steps performed in parallel, each step performed by a part of the processing unit.

In some existing processing architectures, a set of computer instructions is implicitly sequential such that after executing one computer instruction of the set of computer instructions, by default the processing unit executes a consecutive computer instruction thereof. A control-flow instruction is a computer instruction that controls an order in which the set of computer instructions is executed. A control-flow instruction directs the processing unit to execute, after executing the one computer instruction, another computer instruction which may be not consecutive thereto. Some examples are a jump instruction, a conditional branch instruction and a function call instruction. For brevity, henceforth the term "branch instruction" is used to mean a control-flow instruction and may be conditional or non-conditional.

In some existing processing architectures, when a processing unit executes a set of computer instructions data values are communicated between the computer instructions using explicit storage. The storage may be a memory area. The storage may be a register of the processing unit. Executing the set of computer instructions by a processing unit implementing an instruction pipeline requires attention to guarantee that each computer instruction operates on one or more data values which are consistent with completing execution of all previous instructions. When the set of instructions comprises no branch instructions, an order in which the set of instructions is executed may be predictable. However, when the set of instructions comprises a branch instruction, it may be that the order in which the set of instructions is executed depends on one or more data values computed while executing the set of instructions. Thus, the order in which the set of instructions is executed may not be fully predictable when the set of instructions comprises one or more branch instructions.

SUMMARY

In some embodiments described in the present disclosure, computing a set of computer instructions comprises executing a set of anticipated computer instructions produced based on one or more likely data values of one or more data variables of the set of computer instructions, and when at least one data variable is not equal to a respective likely data value restoring a processing circuitry to an initial state and executing a set of alternative computer instructions.

The foregoing and other objects are achieved by the features of the independent claims. Further implementation forms are apparent from the dependent claims, the description and the figures.

According to a first aspect of the invention, an apparatus for computing comprises at least one processing circuitry configured for computing an outcome of executing a set of computer instructions comprising a group of data variables, by: identifying an initial state of the at least one processing circuitry; identifying at least one likely data value, where the at least one likely data value is at least one value of at least one of the group of data variables anticipated to be computed by executing the set of computer instructions and computed using one or more program data values of the set of computer instructions; and configuring the at least one processing circuitry for: executing at least part of a set of anticipated computer instructions produced according to a likely order of execution of the set of computer instructions predicted based on the set of computer instructions and the at least one likely data value, such that the set of anticipated computer instructions is not limited by an amount of branch instructions; and when, while executing the at least part of the set of anticipated computer instructions, identifying a failed prediction where the at least one data variable is not equal to the at least one likely data value according to at least one data variable test: restoring the initial state of the at least one processing circuitry; and executing one of at least one set of alternative computer instructions, produced based on the set of computer instructions and the at least one likely data value. Executing at least part of a set of anticipated computer instructions generated based on the at least one likely data value anticipated to be computed by executing the set of computer instructions increases a likelihood of correctly predicting an order of execution of the set of anticipated computer instructions, and thus increases performance of the at least one processing circuitry by reducing an amount of times there is a need to flush an execution pipeline thereof. Computing the at least one likely data value using one or more program data values of the set of computer instructions increases accuracy of the one or more likely data values, further increasing the likelihood of correctly predicting the order of execution of the set of anticipated computer instructions.

According to a second aspect of the invention, a method for computing comprises: identifying an initial state of at least one processing circuitry; identifying at least one likely data value, where the at least one likely data value is at least one value of at least one of the group of data variables anticipated to be computed by executing the set of computer instructions and computed using one or more program data values of the set of computer instructions; and configuring the at least one processing circuitry for: executing at least part of a set of anticipated computer instructions produced according to a likely order of execution of the set of computer instructions predicted based on the set of computer instructions and the at least one likely data value, such that the set of anticipated computer instructions is not limited by an amount of branch instructions; and when, while executing the at least part of the set of anticipated computer instructions, identifying a failed prediction where the at least one data variable is not equal to the at least one likely data value according to at least one data variable test: restoring the initial state of the at least one processing circuitry; and executing one of at least one set of alternative computer instructions, produced based on the set of computer instructions and the at least one likely data value.

According to a third aspect of the invention, an apparatus for computing comprises at least one hardware processor adapted for: identifying at least one likely data value, where the at least one likely data value is at least one value of at least one of a group of data variables of a set of computer instructions, anticipated to be computed by executing the set of computer instructions and computed using one or more program data values of the set of computer instructions; identifying an initial state of at least one processing circuitry; producing a set of anticipated computer instructions and at least one set of alternative computer instructions, produced according to a likely order of execution of the set of computer instructions predicted based on the set of computer instructions and the at least one likely data value, such that the set of anticipated computer instructions is not limited by an amount of branch instructions; and configuring at least one processing circuitry to execute the set of computer instructions by: executing at least part of the set of anticipated computer instructions; and when, while executing the at least part of the set of anticipated computer instructions, identifying a failed prediction where the at least one data variable is not equal to the at least one likely data value according to at least one data variable test: restoring the initial state of the at least one processing circuitry; and executing one of the at least one set of alternative computer instructions. Generating the set of anticipated computer instructions based on the one or more likely data values reduces a likelihood of identifying a failed prediction when executing the set of anticipated computer instructions, thus reducing an amount of times there is a need to flush a pipeline of the at least one processing circuitry. Computing the one or more likely data values using one or more program data values of the set of computer instructions increases accuracy of the one or more likely data values, further reducing the likelihood of identifying a failed prediction when executing the set of anticipated computer instructions.

According to a fourth aspect of the invention, a method for computing comprises: identifying at least one likely data value, where the at least one likely data value is at least one value of at least one of a group of data variables of a set of computer instructions, anticipated to be computed by executing the set of computer instructions and computed using one or more program data values of the set of computer instructions; identifying an initial state of at least one processing circuitry; producing a set of anticipated computer instructions and at least one set of alternative computer instructions, produced according to a likely order of execution of the set of computer instructions predicted based on the set of computer instructions and the at least one likely data value, such that the set of anticipated computer instructions is not limited by an amount of branch instructions; and configuring at least one processing circuitry to execute the set of computer instructions by: executing at least part of the set of anticipated computer instructions; and when, while executing the at least part of the set of anticipated computer instructions, identifying a failed prediction where the at least one data variable is not equal to the at least one likely data value according to at least one data variable test: restoring the initial state of the at least one processing circuitry; and executing one of the at least one set of alternative computer instructions.

With reference to the first and second aspects, in a first possible implementation of the first and second aspects of the present invention the at least one processing circuitry is further configured for: collecting a plurality of statistical values comprising a plurality of data-statistic values indicative of one or more data values of the group of data variables while executing the set of computer instructions, and additionally or alternatively at least one branch-statistic value, indicative of a selected instruction executed in response to executing at least one branch instruction of the set of computer instructions; and providing the plurality of statistical values to at least one hardware processor for the purpose of identifying the at least one likely data value according to the plurality of statistical values. Optionally, the at least one processing circuitry comprises telemetry circuitry for collecting at least one of the plurality of statistical values. Optionally, the set of computer instructions comprises at least one monitoring instruction for collecting at least one of the plurality of statistical values. Using telemetry circuitry and additionally or alternatively at least one monitoring instructions to collect the plurality of statistical values increases accuracy of identifying the at least one likely data value, thus increasing accuracy of the set of anticipated instructions.

With reference to the first and second aspects, in a second possible implementation of the first and second aspects of the present invention the at least one processing circuitry comprises a processing circuitry having a von Neumann architecture. Optionally, the at least one processing circuitry comprises at least one of: a central processing unit, a data processing unit (DPU), a multi-core central processing unit (CPU), a microcontroller unit (MCU) and an accelerated processing unit (ACU). Optionally, the at least one processing circuitry comprises a processing circuitry having a non-von Neumann architecture. Optionally, the at least one processing circuitry comprises at least one of: a data processing unit (DPU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions.

With reference to the first and second aspects, in a third possible implementation of the first and second aspects of the present invention the at least one processing circuitry comprises a first processing circuitry and a second processing circuitry, the first processing circuitry is not the second processing circuitry, executing the at least part of the set of anticipated computer instructions is by the first processing circuitry, and executing the set of alternative computer instructions is by the second processing circuitry. Optionally, identifying the initial state of the at least one processing circuitry comprises identifying a plurality of state values of the first processing circuitry, and restoring the initial state of the at least one processing circuitry comprises configuring the second processing circuitry according to the plurality of state values. Executing the set of alternative computer instructions on a second processing circuitry different from a first processing circuitry executing the set of anticipated instructions allows optimizing each of the set of alternative computer instructions and the set of anticipated computer instructions according to the respective processing circuitry, increasing overall performance of an apparatus implemented according to the present disclosure.

With reference to the first and second aspects, in a fourth possible implementation of the first and second aspects of the present invention the at least one processing circuitry has a set of supported instructions and the set of supported instructions comprises a restore instruction for configuring a state of the processing circuitry according to a previously known state of the processing circuitry. Optionally, restoring the initial state of the at least one processing circuitry comprises executing the restore instruction subject to identifying the failed prediction while executing the at least part of the set of anticipated computer instructions. Using a restore instruction of a set of supported instructions of the at least one processing circuitry simplifies restoring the initial state of the at least one processing circuitry when identifying the failed prediction, simplifying executing the set of alternative computer instructions, thus simplifying ease of use compared to requiring multiple instructions to restore the initial state.

With reference to the third and fourth aspects, in a first possible implementation of the third and fourth aspects of the present invention the at least one hardware processor is further configured for: receiving, from at least one other hardware processor, a plurality of statistical values comprising a plurality of data-statistic values indicative of one or more data values of the group of data variables while executing the set of computer instructions and additionally or alternatively at least one branch-statistic value, indicative of a selected instruction executed in response to executing at least one branch instruction of the set of computer instructions; and identifying the at least one likely data value according to the plurality of statistical values.

With reference to the third and fourth aspects, or the first implementation of the third and fourth aspects, in a second possible implementation of the third and fourth aspects of the present invention producing the set of anticipated computer instructions comprises adding to the set of anticipated computer instructions: at least one store instruction for storing the initial state of the at least one processing circuitry, the at least part of the set of anticipated computer instructions produced based on the set of computer instructions and the at least one likely data value, at least one state test instruction for identifying the failed prediction, and at least one restore instruction to restore the initial state of the at least one processing circuitry. Optionally, producing the at least part of the set of anticipated computer instructions comprises identifying in the set of computer instructions at least one set of tentative instructions, each associated with at least one local test instruction, such that each set of tentative instructions is anticipated to be executed subject to an outcome of the respective at least one local test instruction associated therewith. Optionally, the at least one state test instruction is produced according to the at least one local test instruction. Storing the initial state of the at least one processing circuitry allows correct execution of the set of alternative computer instructions when the failed prediction is identified after executing more instructions of the set of anticipated computer instructions than supported by flushing a pipeline of the at least one processing circuitry.

With reference to the third and fourth aspects, or the first implementation of the third and fourth aspects, in a third possible implementation of the third and fourth aspects of the present invention producing the set of anticipated computer instructions comprises: identifying in the set of computer instructions at least one loop of computer instructions; identifying, according to the plurality of statistical values, an expected amount of iterations of the loop of computer instructions; and generating a rolled-out loop of instructions by repeating at least some of the loop of computer instructions the expected amount of iterations of the loop. Optionally, producing the set of anticipated computer instructions further comprises: identifying in the rolled-out loop of instructions a plurality of data-independent operations, where an expected outcome of executing the plurality of data-independent operations does not depend on modifying a runtime value of another of the group of data variables while executing the rolled-out loop of instructions; and producing the set of anticipated computer instructions according to the expected outcome. Optionally, producing the set of anticipated computer instructions according to the expected outcome further comprises: identifying in the rolled-out loop of instructions a plurality of memory access operations to a plurality of vector elements of a vector data variable of the set of computer instructions; and replacing the plurality of memory access operations with a single equivalent memory operation. Repeating at least some of the loop of computer instructions the expected amount of iterations of the loop reduces an amount of branch instructions in the set of anticipated computer instructions and thus facilitates increasing a likelihood of correctly predicting an order of execution of the set of anticipated computer instructions. Producing the set of anticipated computer instructions according to the expected outcome of executing the plurality of data-independent operations allows reducing the amount of branch instructions in the set of anticipated computer instructions and thus facilitates increasing the likelihood of correctly predicting an order of execution of the set of anticipated computer instructions.

With reference to the third and fourth aspects, or the first implementation of the third and fourth aspects, in a fourth possible implementation of the third and fourth aspects of the present invention producing the set of anticipated computer instructions comprises: producing a first set of anticipated computer instructions according to the expected outcome; identifying in the first set of anticipated computer instructions a plurality of other data-independent operations, where another expected outcome of executing the plurality of other data-independent operations does not depend on modifying another runtime value of yet another of the group of data variables while executing the first set of anticipated computer instructions; and producing a second set of anticipated computer instructions according to the other expected outcome. Optionally, producing the set of anticipated computer instructions comprises: producing another first anticipated set of instructions based on the at least one likely data value; identifying according to the plurality of statistical values at least one other likely data value, where the at least one other likely data value is at least one other value of at least one other of the group of data variables anticipated while executing the other first anticipated set of instructions; and producing another second anticipated set of instructions based on the at least one other likely data value. Identifying a plurality of other data-independent operations in the first set of anticipated computer instructions, and additionally or alternatively identifying at least one other likely data value according to the plurality of statistical values, allows increasing accuracy of the additional set of anticipated instructions, further increasing performance of a system implemented according to the present disclosure.

With reference to the third and fourth aspects, or the first implementation of the third and fourth aspects, in a fourth possible implementation of the third and fourth aspects of the present invention configuring the at least one processing circuitry comprises: computing at least one anticipated data-flow graph according to the set of anticipated computer instructions; and projecting the at least one data-flow graph onto at least part of the at least one processing circuitry. Optionally, configuring the at least one processing circuitry comprises: computing at least one alternative data-flow graph according to at least one of the at least one set of alternative computer instructions; and projecting the at least one alternative data-flow graph onto at least another part of the at least one processing circuitry. Projecting one or more data-flow graphs to one or more parts of the at least one processing circuitry allows executing the set of anticipated computer instructions and additionally or alternatively at least one set of alternative computer instructions on a processing circuitry that is adapted for executing a data-flow, increasing performance of a system implemented according to the present disclosure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
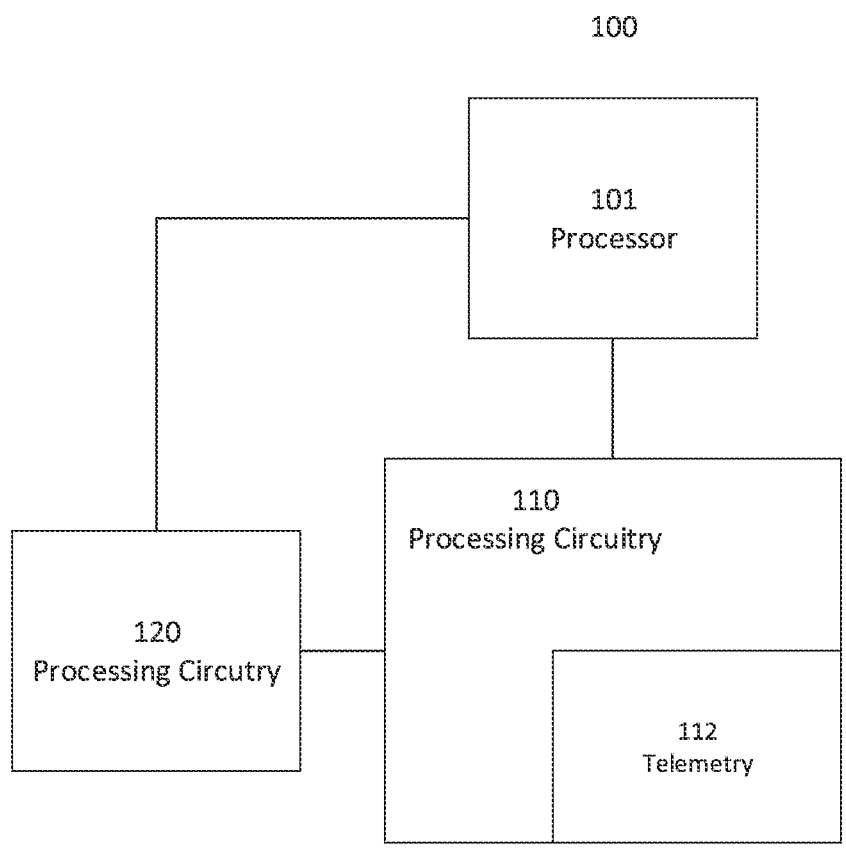
FIG. 1 is a schematic block diagram of an exemplary apparatus, according to some embodiments.

In many existing computer architectures, execution of an instruction comprises fetching the instruction from a code storage storing the set of computer instructions and loading the instruction into a dedicated area of processing circuitry of the processing unit. When the processing unit comprises an instruction pipeline, a new instruction is loaded into the instruction pipeline before execution of a previous instruction completes.

When the order in which the set of computer instructions is executed is predictable, using an instruction pipeline to execute the set of computer instructions is relatively straightforward, mostly impacted by limitations of the explicit storage for communicating data values. Provided there exists sufficient storage for communicating data values between the computer instructions, the set of computer instructions may be loaded into the instruction pipeline in the predictable order.

However, when the order of executing the set of instructions is not predictable, it is not always clear which new instruction to load into the pipeline. For example, an identified data value computed in an instruction preceding a conditional branch instruction may determine an outcome of executing the conditional branch instruction. In such an example, identifying a correct next instruction to load into the instruction pipeline after loading the conditional branch instruction requires completing execution of the instruction preceding the conditional branch instruction to compute the identified data value.

A simple approach to loading a set of instructions into a pipeline is to refrain from fetching and loading the correct next instruction until the identified data value is computed. This approach reduces improvements to the processing unit's performance as the pipeline is not fully utilized.

Another approach is to use a default criterion for selecting the next instruction, for example always selecting a consecutive instruction following the conditional branch instruction. However, using this approach a wrong next instruction may be loaded into the pipeline. This is known as a failed prediction. To recover from a failed prediction, upon identifying that a wrong next instruction is loaded into the pipeline there is a need to flush out of the pipeline any other instructions loaded after the wrong next instruction and instead load a correct next instruction. Flushing the pipeline impacts the processing unit's performance in a manner similar to stalling the processing unit until the identified data value is computed, thus in this approach there is a need to reduce an amount of failed predictions, i.e. an amount of wrong next instructions loaded into the pipeline.

To mitigate an amount of times the pipeline is flushed, some processing unit architectures implement one or more branch prediction methods for predicting an outcome of a branch instruction before it is possible to know the outcome definitively. Such solutions typically comprise dedicated hardware for collecting a plurality of historical outcomes of executing one or more branch instructions and computing a new expected outcome of executing an identified branch instruction based on the plurality of historical outcomes. Some solutions compute the new expected outcome using historical outcomes of executing the identified branch instruction. Some other solutions compute the new expected outcome using historical outcomes of executing more than one branch instruction. However, as dedicated hardware is required, such solutions are limited in an amount of branch instructions for which branch prediction may be performed at any given time, for example limiting a depth of a decision tree. Such a limit increases a likelihood of having to stall loading the pipeline or of loading a wrong next instruction into the pipeline, and thus reduces performance of the processing unit, i.e. reduces throughput and additionally or alternatively increases latency of the processing unit.

In some computer architectures a processing unit computes in parallel more than one possible outcome of executing the identified branch instruction, however such solutions are limited in the amount of branch instructions for which more than one possible outcome may be computed in parallel.

In addition, the identified branch instruction may be executed in a plurality of execution paths of a program. An outcome of executing the identified branch instruction when invoked by one part of a program may not be indicative of another outcome of executing the identified branch instruction when invoked by another part of the program. For example, an argument value of a function may effect an outcome of executing the identified branch instruction of the function. When invoked more than once, the function may be invoked each time with a different argument value, such that one outcome of executing the identified branch instruction is not indicative of another outcome of executing the branch instruction, thus increasing a likelihood of a failed prediction and increasing a likelihood of flushing the pipeline.

The present disclosure proposes, in some embodiments described herein, predicting a likely order of execution of a set of computer instructions based on one or more likely data values of a group of data variable of a set of computer instructions. The one or more likely data values are one or more values of at least one of the group of data variables anticipated to be computed by executing the set of computer instructions. Optionally, the one or more likely data values are computed using one or more program data values of the set of computer instructions, where the set of computer instructions has program data and where a program data value is a value of the program data of the set of computer instructions. Optionally, the one or more likely data values are computed by applying one or more arithmetic operations to the one or more program data values of the set of computer instructions. This is as opposed to an anticipated program counter value, for example. For example, a likely data value may be computed by computing a bitwise Boolean NOT of a program data value. In another example, a likely data value is computed by adding two or more program data values. Optionally, the one or more likely data values are retrieved while executing the set of computer instructions, for example from a memory storing program data of the set of computer instructions. The memory may be a non-volatile digital storage. The memory may be a memory component, for example a random access memory (RAM) component. Optionally, the one or more likely data values are received via a digital communication network interface. Optionally, the one or more likely data values are used by at least one of the set of computer instructions when executing the set of computer instructions. For example, the one or more likely data values may be one or more arguments of the at least one of the set of computer instructions, for example when the at least one computer instruction has an arithmetic operation or a comparison operation. Optionally, anticipating that the one or more likely data values are to be computed by executing the set of computer instructions is when compiling the set of computer instructions, or when compiling a source code from which the set of computer instructions are generated. Optionally, anticipating that the one or more likely data values are to be computed by executing the set of computer instructions is when recompiling the set of computer instructions, for example during runtime of the set of computer instructions. Optionally recompiling the set of computer instructions is from the source code. Optionally recompiling the set of computer instructions is from another representation of a computer program, for example an intermediate representation that is independent from a programming language. Optionally, the one or more likely data values comprise a range of likely data values. Optionally, anticipating that the one or more likely data values are to be computed by executing the set of computer instructions comprises anticipating one or more relations between the one or more likely data values and additionally or alternatively anticipating one or more correlations between the one or more likely data values. In such embodiments, the present disclosure proposes using the one or more likely data values to produce a set of anticipated computer instructions. In addition, one or more sets of alternative computer instructions are optionally produced based on the one or more likely data values. In such embodiments, the present disclosure proposes identifying an initial state of a processing circuitry executing the set of computer instructions, and identifying while executing at least part of the set of anticipated computer instructions a failed prediction where one or more of the group of data variables is not equal to the one or more likely data values.

Optionally, determining the one or more data variables is not equal to the respective likely data value is according to one or more data variable tests. Optionally, the one or more data variable tests comprise comparing the one or more data variables to a range of likely data values. Optionally, the one or more data variable tests comprise applying one or more bit masks to the one or more data variables. Optionally, applying the one or more data variable tests comprises computing a relation between the one or more likely data values. Optionally, applying the one or more data variable tests comprises identifying a correlation between the one or more data values, optionally according to the one or more likely data values.

Optionally, when identifying the failed prediction, the present disclosure proposes restoring the initial state of the processing circuitry and executing one of the one or more sets of alternative computer instructions. Generating a set of anticipated computer instructions based on one or more likely data values anticipated to be computed by executing the set of computer instructions increases a likelihood of correctly predicting an order of execution of the set of anticipated computer instructions, and thus reduces an amount of times there is a need to flush the pipeline. Computing the one or more likely data values using one or more program data values of the set of computer instructions increases accuracy of the one or more likely data values, further increasing the likelihood of correctly predicting the order of execution of the set of anticipated computer instructions. In addition, the set of anticipated computer instructions generated based on the one or more likely data values is not limited by an amount of branch instructions, and executing the set of anticipated computer instructions increases performance of the processing unit, i.e. increases throughput and additionally or alternatively reduces latency, compared to using other methods of branch prediction when an amount of simultaneously active branch instructions exceeds a limit of a processing unit's dedicated hardware for branch prediction. In addition, generating the set of anticipated computer instructions based on the one or more likely data values reduces a likelihood of identifying a failed prediction when executing the set of anticipated computer instructions, thus reducing an amount of times there is a need to flush the pipeline.

For example, in some embodiments, when a first set of computer instructions of a program comprises a call to a function with an argument equal to a first data value, a first set of anticipated computer instructions is generated based on the first data value. In such embodiments, when a second set of computer instructions of the program comprises another call to the function with the argument equal to a second data value, a second set of anticipated computer instructions is generated based on the second data value. In this example, when executing the program, the processing unit executes the first set of computer instructions by executing the first set of anticipated computer instructions and executes the second set of computer instructions by executing the second set of anticipated computer instructions. The first set of anticipated computer instructions may be different than the second set of anticipated computer instructions according to a difference between the first data value and the second data value, reducing a need to flush the pipeline when executing either of the two sets of anticipated computer instructions.

In addition, generating one or more sets of alternative computer instructions facilitates executing at least some of the one or more sets of alternative computer instructions on another processing circuitry, other than a processing circuitry executing the set of anticipated computer instructions and optionally connected thereto. Executing a set of alternative computer instructions on another processing circuitry allows optimizing each of the set of alternative computer instructions and the set of anticipated computer instructions according to the respective processing circuitry, increasing overall performance of an apparatus comprising the processing circuitry and the other processing circuitry, i.e. increasing throughput and additionally or alternatively reducing latency of the apparatus. In some embodiments of the present invention, an apparatus comprises one or more processing units for computing the set of anticipated computer instructions and optionally computing one or more sets of alternative computer instructions. Optionally, the one or more processing units execute the set of anticipated computer instructions. Optionally, when a failed prediction is identified, one of the one or more sets of alternative computer instructions is executed by the one or more processing units. Optionally, the one or more processing units configure one or more processing circuitry to execute the set of anticipated computer instructions. Optionally, the one or more processing units configure the one or more processing circuitry to execute one of the one or more sets of alternative computer instructions when a failed prediction is identified. In a possible example, a processing unit executing the set of computer instructions configures part of a reconfigurable processing grid connected thereto to execute the anticipated computer instructions, for example in order to accelerate execution of the set of computer instructions. In this possible example, when a failed prediction is identified, a set of alternative computer instructions is executed by the processing unit. In another example, the processing unit configures one part of the reconfigurable processing grid to execute the set of anticipated computer instructions, and configures another part of the reconfigurable processing grid to execute the set of alternative computer instructions when a failed prediction is identified or in parallel. Optionally, when a failed prediction is identified, the processing unit configures one or more memory values of a memory coupled with the processing unit. Additionally, or alternatively, when a failed prediction is identified, the processing unit provides one or more other memory values read from the memory, optionally when executing the set of anticipated computer instructions, as input to the set of alternative computer instructions. Further additionally, or alternatively, when a failed prediction is identified, the processing unit provides as input to the set of alternative computer instructions at least one indication of writing one or more yet other memory value to the memory. Optionally, the one or more yet other memory values are written to the memory when executing the set of anticipated computer instructions. Optionally, the one or more yet other memory values are written to the memory when configuring the one or more processing circuitry to execute the set of alternative computer instructions. Optionally, when the memory is a transactional memory, when a failed prediction is identified, the processing unit rolls back one or more memory write accesses to the transactional memory performed when executing the set of anticipated instructions. Additionally, or alternatively, when a failed prediction is identified the processing unit refrains from committing the one or more memory write accesses to the transactional memory.

In addition, generating the one or more sets of alternative computer instructions facilitates executing at least some of the one or more sets of alternative computer instructions in parallel to executing the set of anticipated computer instructions, reducing latency of recovering from a failed prediction and increasing the apparatus' performance.

In some embodiments described in the present disclosure, the one or more likely data values are identified by collecting a plurality of statistical values while executing the set of computer instructions. An example of a statistical value is a data-statistic value, indicative of one or more data values of the group of data variables computed by executing the set of computer instructions. Another example of a statistical value is a branch-statistic value, indicative of a selected instruction executed in response to executing at least one branch instruction of the set of computer instructions. Using a plurality of data-statistic values indicative of one or more data values of the group of data variables while executing the set of computer instructions and additionally or alternatively one or more branch-statistic value indicative of a selected instruction executed in response to executing at least one branch instruction of the set of computer instructions increases accuracy of the set of anticipated computer instructions, for example when at least some of the one or more data values are repeated over time, and thus increases performance of the processing unit, i.e. increases throughput and additionally or alternatively reduces latency of the processing unit.

Optionally, one or more of the plurality of statistical values are collected by hardware, for example using telemetry circuitry of the processing circuitry. Optionally, one or more other of the plurality of statistical values are collected by software, for example using one or more monitoring instructions of the set of computer instructions, also known as instrumentation instructions.

In some embodiments, predicting the likely order of execution of the set of computer instructions is a dynamic process, i.e. the set of anticipated computer instructions is modified dynamically. In such embodiments, a new set of anticipated computer instructions is produced in each of a plurality of iterations, where the new set of anticipated computer instructions is produced based on one or more new likely data values of the group of data variables. Optionally, the one or more new likely data values are identified according to a new plurality of statistical values collected when executing a set of anticipated computer instructions generated in a previous iteration.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary apparatus 100, according to some embodiments. In such embodiments, apparatus 100 comprises one or more processing circuitry 110. Optionally, at least one of one or more processing circuitry 110 has a von Neumann architecture. Some examples of a processing circuitry having a von Neumann architecture are a central processing unit, a multi-core central processing unit (CPU), a data processing unit (DPU), a microcontroller unit (MCU) and an accelerated processing unit (ACU). Optionally, at least one of one or more processing circuitry 110 has a non-von Neumann architecture. Some examples of a processing circuitry having a non-von Neumann architecture are a graphical processing unit (GPU), a data processing unit (DPU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid. Optionally, an interconnected computing grid comprises a plurality of reconfigurable logical elements connected by a plurality of configurable data routing junctions. An example of a reconfigurable logical element is processing circuitry that may be configured to perform one of an identified set of mathematical and logical operations. Some examples of a mathematical operation are addition and subtraction. Some examples of a logical operation are a logical NOT operation and a logical AND operation.

Optionally, apparatus 100 comprises at least one other processing circuitry 120 where at least one other processing circuitry 120 is not one of one or more processing circuitry 110. Optionally, at least one other processing circuitry 120 has a von Neumann architecture. Optionally, at least one other processing circuitry 120 has a non-von Neumann architecture.

For brevity, unless explicitly noted, henceforth the term "processing circuitry" is used to mean both "one or more processing circuitry" and "at least one processing circuitry" and the terms are used interchangeably.

Optionally, processing circuitry 110 is connected to other processing circuitry 120. Optionally, processing circuitry 110 is electrically coupled with other processing circuitry 120, optionally using an interconnect bus. Some examples of an interconnect bus are, but are not limited to, Compute Express Link (CXL) interconnect, Gen-Z cache coherent interconnect for accelerators (CCIX), Coherent Accelerator Processor Interface (CAPI), and Peripheral Component Interconnect Express (PCI-e). Optionally, processing circuitry 110 is connected to other processing circuitry 120 via one or more digital communication network interfaces of processing circuitry 110 (not shown). Optionally, the one or more digital communication network interface is connected to a local area network (LAN), for example an Ethernet network or a wireless network.

Optionally, other processing circuitry 120 is a host processing unit, executing a software program comprising the set of computer instructions. Optionally, processing circuitry 110 is an acceleration processing circuitry, connected to other processing circuitry for the purpose of accelerating execution of the software program. In one example, other processing circuitry 120 is a CPU and processing circuitry is a GPU. In another example, other processing circuitry 120 is a CPU and processing circuitry 110 is an interconnected computing grid accelerator. In yet another example, other processing circuitry 120 is a CPU and processing circuitry 110 is part of an interconnected computing grid accelerator.

Optionally, processing circuitry 110 is configured for computing an outcome of executing a set of computer instructions. Optionally, the set of computer instructions comprise a group of data variables. Optionally, the set of computer instructions is a block of code of a plurality of blocks of code of a software program. Optionally, processing circuitry 110 is configured for additionally executing one or more other blocks of code of the plurality of blocks of code.

Optionally, processing circuitry 110 comprises telemetry circuitry 112, optionally for the purpose of collecting one or more statistical values, optionally while processing circuitry 110 executes one or more computer instructions. Optionally the one or more statistical values comprise at least one data-statistic value. Optionally the one or more statistical values comprise at least one branch-statistic value. Optionally, telemetry circuitry 112 comprises one or more counters. Optionally, telemetry circuitry 112 comprises one or more memory areas, optionally for collecting historical values of at least some of the group of data variables. Optionally, the historical values comprise one or more memory network hop counters, and additionally or alternatively one or more translation lookaside buffer (TLB) hit counters. Other examples of a historical value of a data variable are a RISC-V processor counter, a high bandwidth memory controller counter, and a memory channel counter.

Optionally, apparatus 100 comprises one or more processing units 101, optionally for the purpose of configuring processing circuitry 110, and additionally or alternatively for the purpose of configuring other processing circuitry 120.

For brevity, unless explicitly noted, henceforth the term "processing unit" is used to mean "one or more processing unit".

Optionally, processing unit 101 comprises processing circuitry having a von Neumann architecture. Optionally, processing unit 101 comprises processing circuitry having a non-von Neumann architecture.

Optionally, processing unit 101 is connected to processing circuitry 110, and additionally or alternatively to processing circuitry 120, via one or more other digital communication network interfaces of processing unit 101 (not shown). Optionally, the one or more other digital communication network interfaces are connected to another LAN. Optionally, the one or more other digital communication network interfaces are connected to a wide area network (WAN), for example the Internet. Optionally, processing unit 101 is electrically coupled with one or more of processing circuitry 110 and processing circuitry 120, optionally using an interconnect bus, for example, but not limited to, CXL, Gen-Z CCIX, CAPI, and PCI-e.

To compute an outcome of executing a set of computer instructions, in some embodiments apparatus 100 implements the following optional method.

Figure 2:
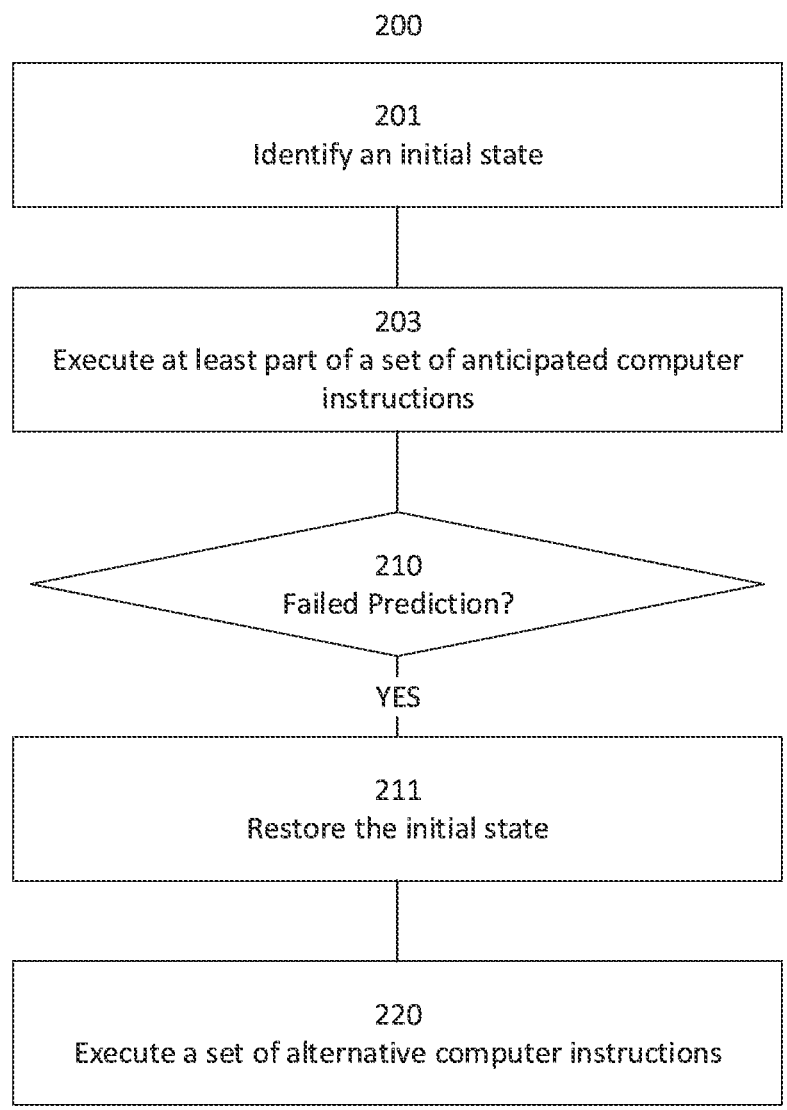
FIG. 2 is a flowchart schematically representing an optional flow of operations for computing, according to some embodiments.

Reference is now made also to FIG. 2, showing a flowchart schematically representing an optional flow of operations 200 for computing, according to some embodiments. In such embodiments, processing circuitry 110 identifies in 201 an initial state thereof. Optionally, processing unit 101 identifies the initial state of processing circuitry 110.

Optionally, the initial state is a state before executing a root branch instruction of the plurality of computer instructions, where there is a statistical significance to a distribution of a plurality of outcomes of executing one or more future branches, and additionally or alternatively one or more future loops, in a plurality of iterations while executing the plurality of computer instructions. Optionally, identifying the initial state of processing circuitry 110 comprises identifying a plurality of state values thereof. An example of a state value is a register value of processing circuitry 110. Other examples of a state value are a local variable value of the plurality of computer instructions, a global variable value of the plurality of computer instructions, a thread-local value of the plurality of computer instructions, a memory state, and a program position in the plurality of computer instructions.

In 203, processing circuitry 110 optionally executes at least part of a set of anticipated computer instructions. Optionally, processing unit 101 configures processing circuitry 110 to execute the at least part of the set of anticipated computer instructions. Optionally, the set of anticipated computer instructions are produced based on the set of computer instructions and one or more likely data values. Optionally, a likely data value is a value of one of the group of data variables of the set of computer instructions, anticipated to be computed by executing the set of computer instructions. Optionally, the one or more likely data values are computed using one or more program data values of the set of computer instructions. Optionally, the one or more likely data values are computed by applying one or more arithmetic operations to the one or more program data values of the set of computer instructions. Some examples of an arithmetic operation are addition, subtraction, multiplication, division, a unitary Boolean operator such as NOT, a bitwise unitary Boolean operator such as bitwise NOT, a binary Boolean operator such as AND, OR and XOR, and a bitwise binary operator such as bitwise AND, bitwise OR and bitwise XOR. Optionally, the one or more likely data values are retrieved while executing the set of computer instructions, for example from a memory component connected to processing circuitry 110. Optionally, the one or more likely data values are received via a digital communication network interface connected to processing circuitry 110. Optionally, anticipating that the one or more likely data values are to be computed by executing the set of computer instructions is when compiling the set of computer instructions, or when compiling a source code from which the set of computer instructions are generated. Optionally, anticipating that the one or more likely data values are to be computed by executing the set of computer instructions is when recompiling the set of computer instructions, for example during runtime of the set of computer instructions. Optionally recompiling the set of computer instructions is from the source code. Optionally recompiling the set of computer instructions is from another representation of a computer program, for example an intermediate representation that is independent from a programming language. Optionally, the one or more likely data values are identified based on a plurality of statistical values collected while executing the set of computer instructions. For example, the plurality of statistical values may be collected when the set of computer instructions is executed by executing the at least part of the set of anticipated computer instructions.

Figure 3:
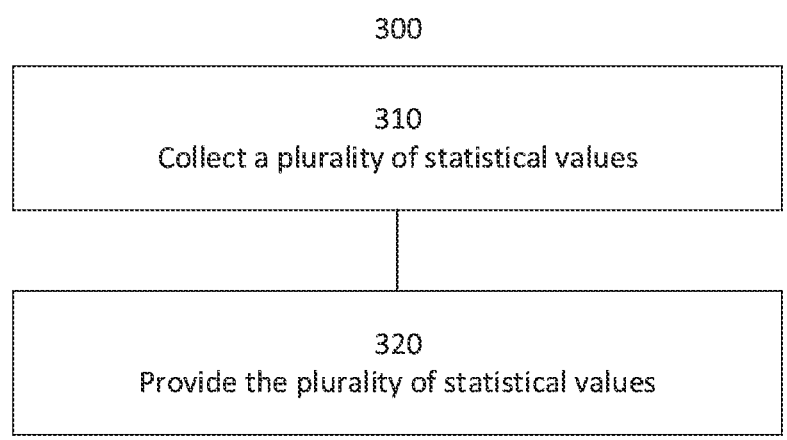
FIG. 3 is a flowchart schematically representing an optional flow of operations for collecting statistical values, according to some embodiments.

Reference is now made also to FIG. 3, showing a flowchart schematically representing an optional flow of operations 300 for collecting statistical values, according to some embodiments. In such embodiments, in 310 processing circuitry collects a plurality of statistical values. Optionally, the plurality of statistical values comprises a plurality of data-statistic values. A data-statistic value is indicative of one or more data values of the group of data variables while executing the set of computer instructions. Optionally, the plurality of statistical values comprises a plurality of branch-statistic values. A branch-statistic value is indicative of a selected instruction executed in response to executing one or more branch instructions of the set of computer instructions.

Optionally, at least some of the plurality of statistical values are collected using telemetry circuitry 112, where telemetry circuitry 112 updates a hardware counter thereof. Optionally, the set of computer instructions comprises instrumentation code for collecting at least some other of the plurality of statistical values, such that the at least some other of the plurality of statistical values are collected using one or more monitoring instructions of the set of computer instructions. Optionally, a monitoring instruction updates a hardware counter of processing circuitry 110, for example a hardware counter of processing circuitry 112. Optionally, a monitoring instruction updates a software counter of the set of computer instructions. Optionally, a counter, whether a hardware counter or a software counter, is updated according to one or more actual values of one or more data variables while executing the set of computer instructions. Optionally, a counter is updated according to an outcome of executing a branch operation of the set of computer instructions.

Optionally, in 320 processing circuitry 110 provides the plurality of statistical values to processing unit 101, optionally for the purpose of processing unit 101 identifying the one or more likely data values.

Reference is now made again to FIG. 2. Optionally, in 210 processing circuitry 110 identifies a failed prediction, where the one or more data variables are not equal the one or more likely data values. Optionally, identifying the failed prediction comprises applying one or more data variable tests to the one or more data variables. Optionally, the one or more likely data values comprise a range of likely data values. Optionally, applying the one or more data variable tests comprises comparing the one or more data variables to the range of likely data values. Optionally, applying the one or more data variable tests comprises applying one or more bit masks to the one or more data variables. Optionally, applying the one or more data variable tests comprises computing a relation between the one or more likely data values. Optionally, applying the one or more data variable tests comprises identifying a correlation between the one or more data values, optionally according to the one or more likely data values.

When identifying the failed prediction in 210, optionally processing circuitry 110 restores the initial state thereof in 211, and in 212 processing circuitry 110 optionally executes one of at least one set of alternative computer instructions. Optionally, processing unit 101 configures processing circuitry 110 to restore the initial state thereof and to execute the one of the at least one set of alternative computer instructions. Optionally, the at least one set of alternative computer instructions is produced based on the set of computer instructions and the one or more likely data values. For example, a set of alternative computer instructions may comprise one or more test instructions where an outcome of executing thereof depends on one or more actual values of at least some of the group of data variables.

Optionally, restoring the initial state of processing circuitry 110 comprises processing circuitry 110 generating a restore signal in response to identifying the failed prediction in 210, and in response to identifying the restore signal configuring at least part of processing circuitry 110 according to the plurality of state values. Optionally, restoring the initial state of processing circuitry 110 comprises configuring one or more memory values of a memory coupled with processing circuitry 110. Optionally, restoring the initial state of processing circuitry 110 comprises providing as input to the set of alternative computer instructions at least one indication of configuring the one or more memory values. Optionally, restoring the initial state of processing circuitry 110 comprises providing one or more other memory values read from the memory, optionally when executing the set of anticipated computer instructions, as input to the set of alternative computer instructions. Further additionally, or alternatively, restoring the initial state of processing circuitry 110 comprises providing as input to the set of alternative computer instructions at least one other indication of writing one or more yet other memory value to the memory. Optionally, the one or more yet other memory values are written to the memory when executing the set of anticipated computer instructions.

Optionally, when the memory is a transactional memory, restoring the initial state of processing circuitry 110 comprises rolling back one or more memory write accesses to the transactional memory performed when executing the set of anticipated instructions. Additionally, or alternatively, restoring the initial state or processing circuitry 110 comprises refraining from committing the one or more memory write accesses to the transactional memory.

Optionally, processing circuitry 110 has a set of supported instructions. Optionally, the set of supported instructions comprises a restore instruction for configuring a state of processing circuitry 110 according to a previously known state thereof. Optionally, restoring in 211 the initial state of processing circuitry 110 comprises executing the restore instruction. Optionally, the restore instruction is executed subject to identifying the failed prediction in 210.

Optionally, restoring in 211 the initial state of processing circuitry 110 comprises configuring other processing circuitry 120 according to the plurality of state values. Optionally, in 212 the set of alternative computer instructions is executed by other processing circuitry 120 instead of, or in addition to, processing circuitry 110.

In some embodiments, apparatus 100 implements the following optional method to produce the set of anticipated computer instructions and compute an outcome of executing the set of computer instructions.

Figure 4:
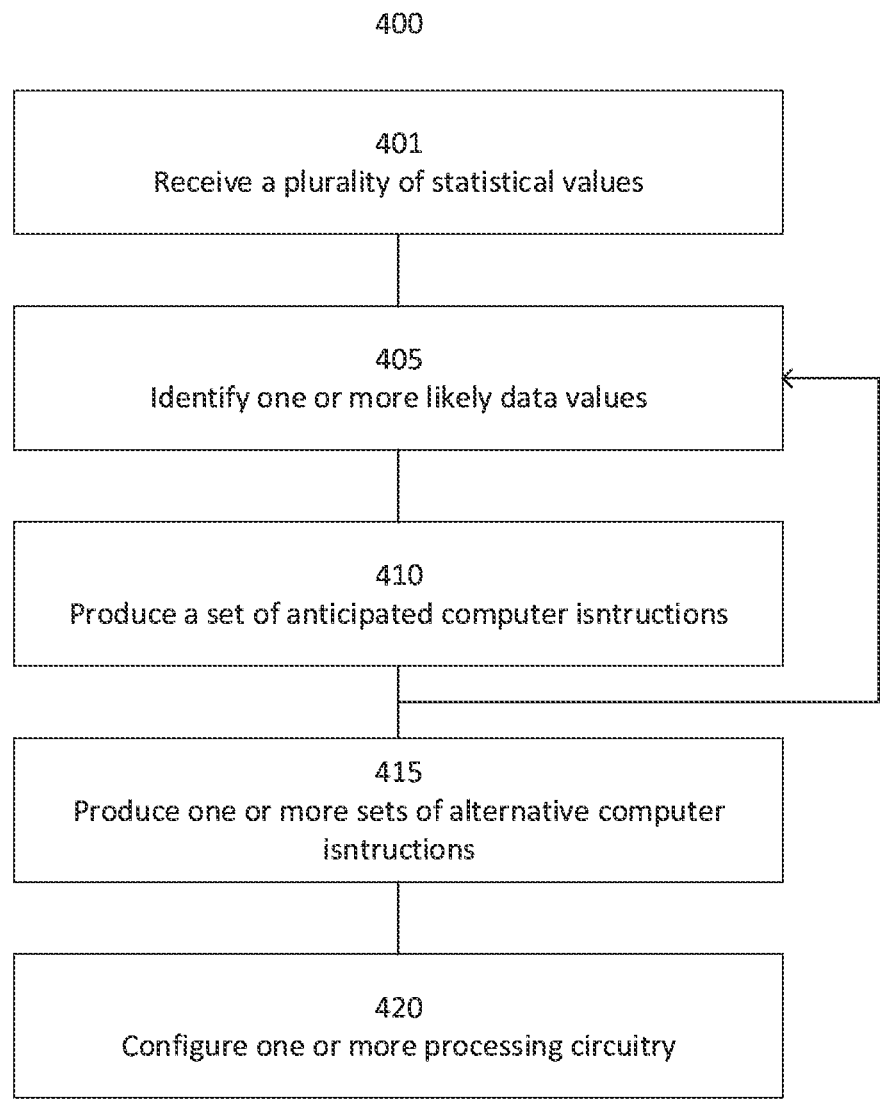
FIG. 4 is a flowchart schematically representing another optional flow of operations for computing, according to some embodiments.

Reference is now made also to FIG. 4, showing a flowchart schematically representing another optional flow of operations 400 for computing, according to some embodiments.

It should be noted that the following description focuses on an embodiment where method 400 is executed at least in part by processing unit 101, however other embodiments exist, for example where method 400 is executed in full by processing circuitry 110.

Optionally, in 401 processing unit 101 receives a plurality of statistical values, optionally from processing circuitry 110. Optionally, the plurality of statistical values comprises a plurality of data-statistic values and additionally or alternatively at least one branch-statistic value. Optionally processing circuitry 110 collects the plurality of statistical values using method 300 described above.

Optionally, in 405 processing unit 101 identifies one or more likely data values. As described above, a likely data value is a value of one of the group of data variables of the set of computer instructions that is anticipated to be computed by executing the set of computer instructions, optionally using one or more program data values of the set of computer instructions. Optionally, 405 is executed when compiling the set of computer instructions or when compiling a source code from which the set of computer instructions are generated.

Optionally, in 410 processing unit 101 produces the set of anticipated computer instructions, optionally based on the set of computer instructions and one or more likely data values.

Figure 5:
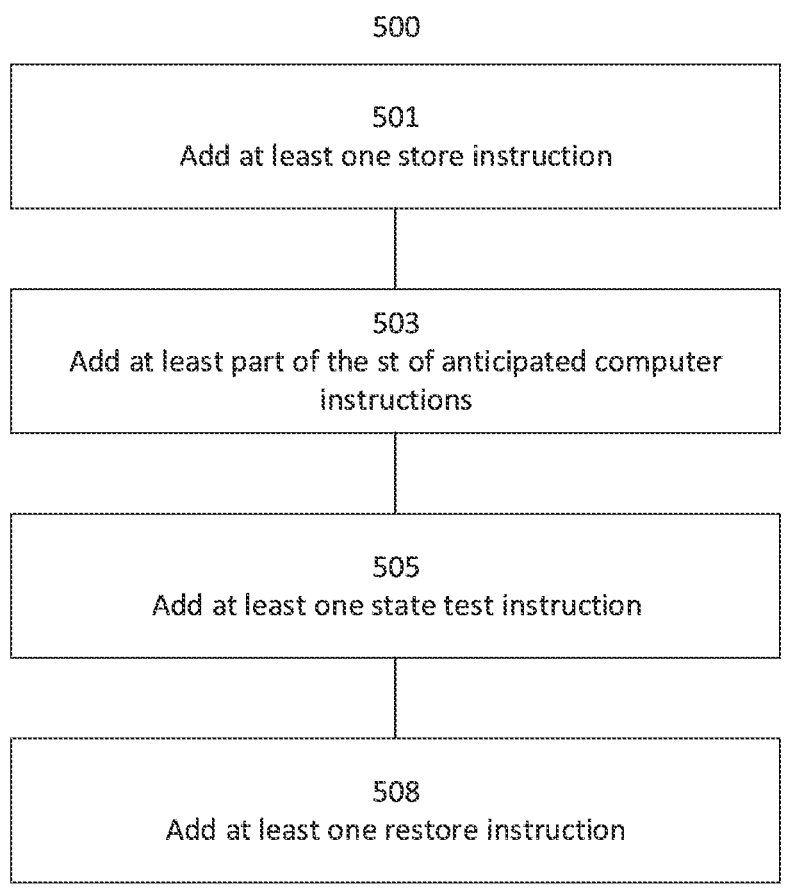
FIG. 5 is a flowchart schematically representing another optional flow of operations for producing a set of anticipated computer instructions, according to some embodiments.

Reference is now made also to FIG. 5, showing a flowchart schematically representing an optional flow of operations 500 for producing a set of anticipated computer instructions, according to some embodiments.

Optionally, to produce the set of anticipated computer instructions, in 501 processing unit 101 adds to the set of anticipated computer instructions one or more store instructions for storing the initial state of processing circuitry 110. In 503 processing unit 101 optionally adds to the set of anticipated computer instructions the at least part of the set of anticipated computer instructions for execution in 203. Optionally, the at least part of the set of anticipated computer instructions are produced based on the set of computer instructions and the one or more likely data values. For example, the set of anticipated computer instructions may replace a data variable of the group of data variables with an anticipated static value, identified according to a data-statistic value of the plurality of statistic values. In another example the set of anticipated computer instructions comprises one or more of the set of computer instructions that do not reference a data variable.

Optionally, producing the at least part of the set of anticipated computer instructions comprises producing an inline path of execution of a plurality of branch instructions, according to a likely path selected according to the one or more likely data values. To do so, producing the at least part of the set of anticipated computer instructions optionally comprises identifying in the set of computer instructions one or more sets of tentative instructions. Optionally, each set of tentative instructions is associated with at least one local test instruction. Optionally, each set of tentative instructions is anticipated to be executed subject to an outcome of the respective at least one local test instruction associated therewith.

In 505 processing unit 101 optionally adds to the set of anticipated computer instructions one or more state test instructions for identifying the failed prediction in 210. Optionally, the one or more state test instructions are produced according to the at least one local test instruction.

Optionally, in 508 processing unit 101 adds to the set of anticipated computer instructions one or more restore instructions to restore the initial state of processing circuitry 110.

Figure 6:
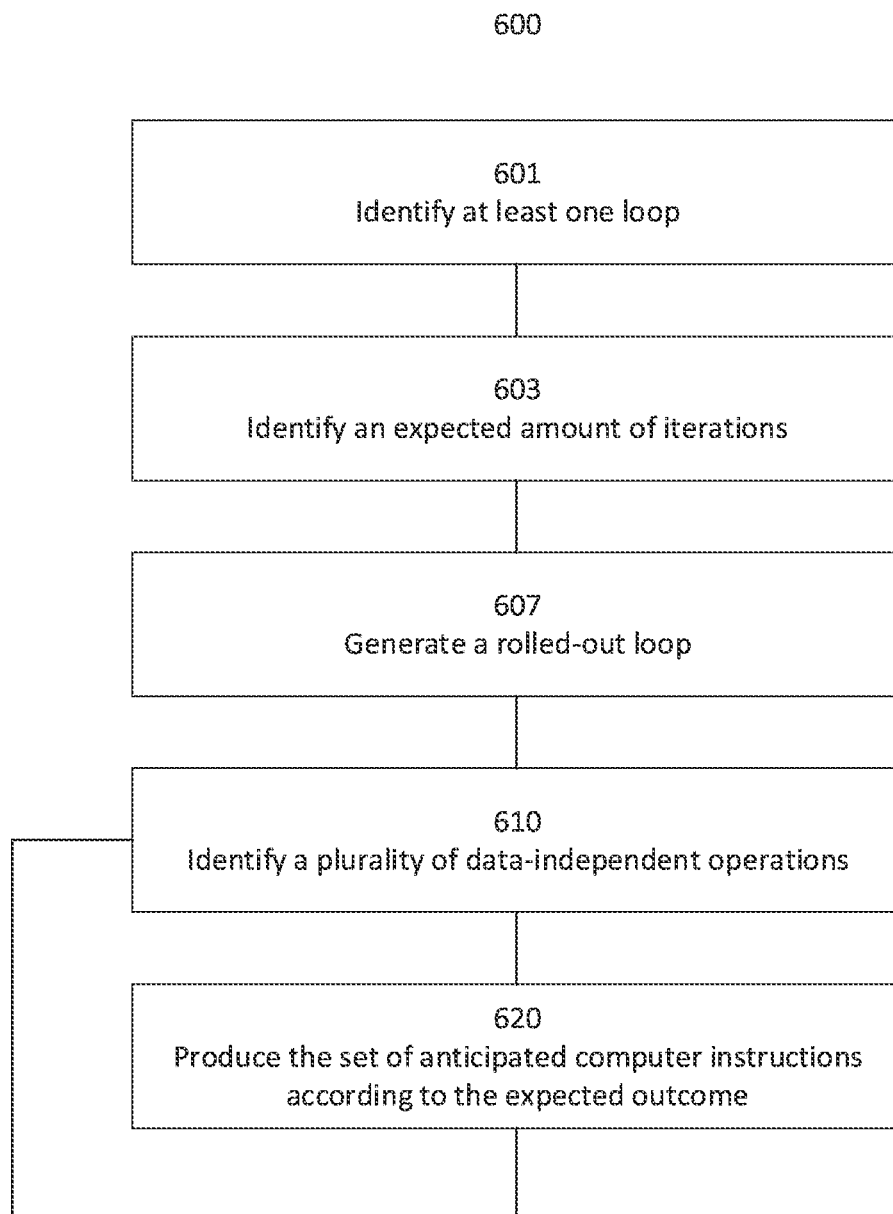
FIG. 6 is a flowchart schematically representing an optional flow of operations for producing a set of anticipated computer instructions comprising a loop, according to some embodiments.

In some embodiments, the set of computer instructions comprises a loop. Reference is now made also to FIG. 6, showing a flowchart schematically representing an optional flow of operations 600 for producing a set of anticipated computer instructions comprising a loop, according to some embodiments. In such embodiments, in 601 processing unit 101 identifies in the set of computer instructions at least one loop of computer instructions. Optionally, in 603 processing unit 101 identifies, according to the plurality of statistical values, an expected amount of iterations of the loop of computer instructions. Optionally, processing unit 101 identifies the expected amount of iterations according to one or more data-statistic values of the plurality of statistical values, indicative of one or more actual data values of one or more of the group of data variables while executing the set of computer instructions. Optionally, processing unit 101 identifies the expected amount of iterations according to one or more branch-statistic values of the plurality of statistical values.

In 607, processing unit 101 optionally generates a rolled-out loop of instructions by repeating at least some of the loop of computer instructions. Optionally, processing unit 101 repeats the at least some of the loop of computer instructions an amount of times equal or less than the expected amount of iterations of the loop.

In some embodiments an expected outcome of executing a group of operations of the rolled-out loop of instructions does not depend on a runtime value of another data variable of the group of data variables while executing the rolled-out loop of instructions. Such a group of operations is called a group of data-independent operations. For example, computing a convolution comprises a plurality of loop iterations comprising a plurality of data-independent operations.

Optionally, in 610 processing unit 101 identifies in the rolled-out loop of instructions a plurality of data-independent operations. In 620, processing unit 101 optionally generates the set of anticipated computer instructions according to the expected outcome.

Optionally, 610 and 620 are repeated in each of a plurality of iterations, where a new group of data-independent operations is identified in a set of anticipated computer instructions generated in a previous iteration such that another expected outcome of executing the new group of data-independent operations does not depend on modifying another runtime value of yet another of the group of data variables while executing the set of anticipated computer instructions generated in a previous iteration. Optionally, processing unit 101 produces a second set of anticipated computer instructions according to the other expected outcome.

Figure 7:
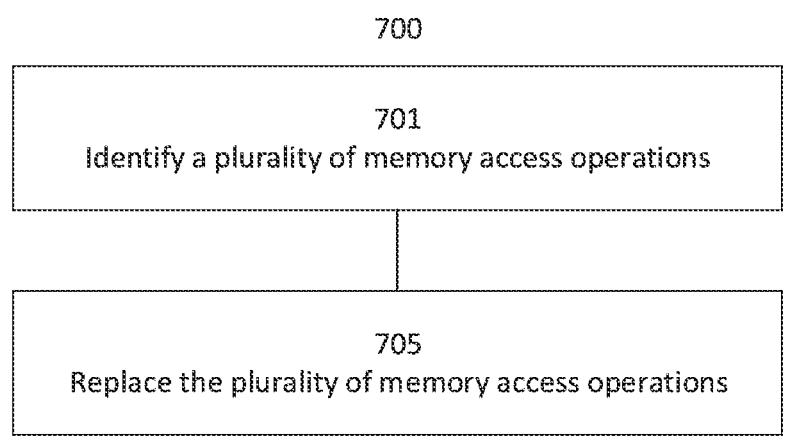
FIG. 7 is a flowchart schematically representing an optional flow of operations for producing a set of anticipated computer instructions comprising a plurality of memory accesses, according to some embodiments.

In some embodiments computing the expected outcome comprises executing a plurality of memory access operations, for example a plurality of memory accesses each to one of a plurality of vector elements of a vector data variable. Reference is now made also to FIG. 7, showing a flowchart schematically representing an optional flow of operations 700 for producing a set of anticipated computer instructions comprising a plurality of memory accesses, according to some embodiments. In such embodiments, in 701 processing unit 101 identifies in the set of rolled-out computer instructions a plurality of memory operations to a plurality of vector elements of a vector data variable of the set of computer instructions. In 705, processing unit 101 optionally replaces the plurality of memory access operations with a single equivalent memory operation.

In some embodiments processing circuitry 110 is a quantum computer. Optionally, producing the set of anticipated computer instructions comprises identifying according to the plurality of statistical values a quantum algorithm equivalent to at least part of the set of computer instructions. Optionally, the set of anticipated computer instructions is produced to implement the identified quantum algorithm.

Reference is now made again to FIG. 4.

Optionally, processing unit 110 repeats 405 and 410 in each of another plurality of iterations, such that processing unit 101 identifies one or more other likely data values according to the plurality of statistical values. Optionally, the one or more other likely data values are one or more other values of one or more other data variables of the group of data variables, anticipated while executing the set of anticipated instructions produced in another previous iteration. Optionally, processing unit 101 produces another set of anticipated computer instructions based on the one or more other likely data values.

Optionally, in 415 processing unit 101 produces the at least one set of alternative computer instructions, optionally based on the set of computer instructions and the one or more likely data values. Optionally, to produce the at least one set of alternative computer instructions processing unit 101 replaces one or more operands of at least one of the set of computer instructions with at least one data values. Optionally, the at least one data value is not a member of the one or more likely data values.

In 420, processing unit 101 optionally configures processing circuitry 110, and additionally or alternatively other processing circuitry 120, to execute the set of computer instructions, optionally using method 200 described above.

A data-flow graph of a group of operations is a representation of the group of operations comprising a plurality of nodes and a plurality of arcs, each connecting two of the plurality of nodes. In a data-flow graph a node represents a place where a data variable of the group of operations is assigned or used, and an arc shows a relationship between a place where a data variable is assigned and another place where the data variable is used. As used herewithin, the term "project a data-flow graph onto processing circuitry" refers to configuring a configurable processing circuitry to implement a data-flow graph. In some embodiments, apparatus 100 uses one or more data-flow graphs to configure processing circuitry 110.

Figure 8:
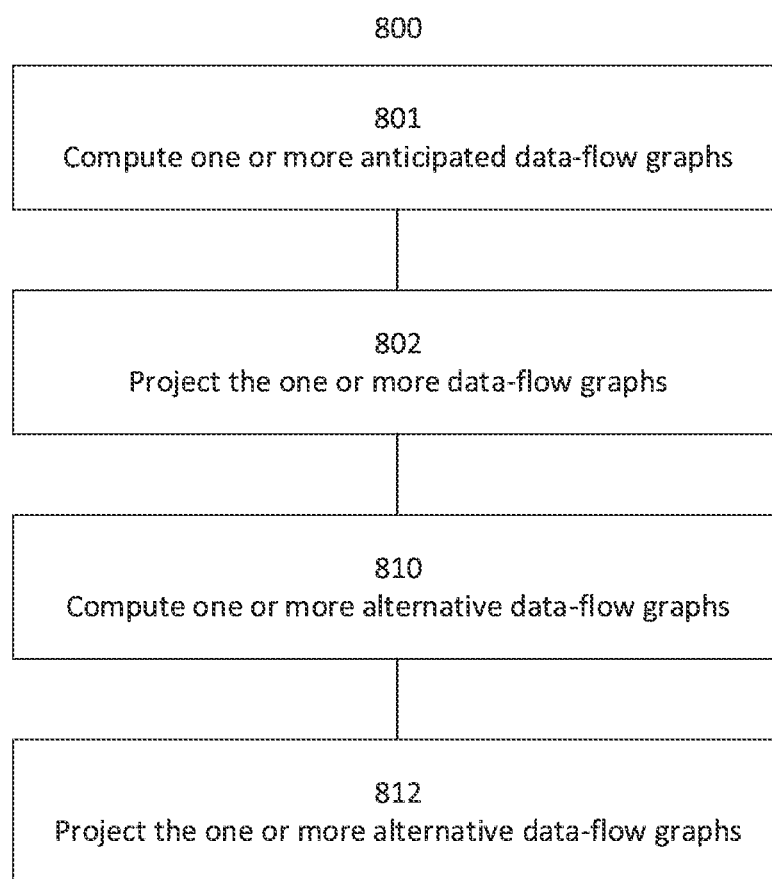
FIG. 8 is a flowchart schematically representing an optional flow of operations for configuring the apparatus, according to some embodiments.

Reference is now made also to FIG. 8, showing a flowchart schematically representing an optional flow of operations 800 for configuring the apparatus, according to some embodiments. In such embodiments, in 801 processing unit 101 computes one or more anticipated data-flow graphs according to the set of anticipated computer instructions. In 802, processing unit 101 optionally projects the one or more data-flow graphs onto at least part of processing circuitry 110.

For example, when processing circuitry 110 is an interconnected computing grid comprising a plurality of reconfigurable logical elements connected by a plurality of configurable data routing junctions, projecting the one or more data-flow graphs onto at least part of processing circuitry 110 optionally comprises modifying at least one reconfigurable logical element of the plurality of reconfigurable logical elements such that at least part of interconnected computing grid computes one or more outcome values in response to input data according to the one or more data-flow graphs. Additionally, or alternatively, projecting the one or more data-flow graphs onto at least part of processing circuitry 110 comprises modifying at least one configurable data routing junction of the plurality of configurable data routing junctions such that the at least part of interconnected computing grid computes the one or more outcome values in response to the input data according to the one or more data-flow graphs.

Optionally, in 810 processing unit 101 computes one or more alternative data-flow graphs according to the at least one set of alternative computer instructions. Optionally, in 812, processing unit 101 projects the one or more alternative data-flow graphs onto at least another part of processing circuitry 110.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant processing circuitries and telemetry circuitries will be developed and the scope of the terms "processing circuitry" and "telemetry circuitry" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus for computing comprising:
    at least one processing circuitry configured for computing an outcome of executing a set of computer instructions of a software program, the set of computer instructions comprising a group of data variables, by:

identifying an initial state of the at least one processing circuitry;

identifying at least one likely data value, where the at least one likely data value is at least one value of at least one of the group of data variables anticipated to be computed by executing the set of computer instructions and computed using one or more program data values of the set of computer instructions, where a program data value is a value of a data variable of the program data of the set of computer instructions and where the one or more likely data values are used by at least one of the set of computer instructions when executing the set of computer instructions, wherein computing the at least one likely data value comprises at least one of: applying a unitary Boolean operator to at least one of the one or more program data values, applying an arithmetic operation to two or more of the one or more program data values, and retrieving the at least one value while executing the set of computer instructions from a non-volatile memory component connected to the at least one processing circuitry; and configuring the at least one processing circuitry for:
executing at least part of a set of anticipated computer instructions produced according to a likely order of execution of the set of computer instructions predicted based on the set of computer instructions and the at least one likely data value; and when, while executing the at least part of the set of anticipated computer instructions, identifying a failed prediction where the at least one data variable is not equal to the at least one likely data value according to at least one data variable test:
restoring the initial state of the at least one processing circuitry; and
executing one of at least one set of alternative computer instructions, produced based on the set of computer instructions and the at least one likely data value.

2. The apparatus of claim 1, wherein the at least one processing circuitry is further configured for:
collecting a plurality of statistical values comprising a plurality of data-statistic values indicative of one or more data values of the group of data variables while executing the set of computer instructions, and additionally or alternatively at least one branch-statistic value, indicative of a selected instruction executed in response to executing at least one branch instruction of the set of computer instructions; and
providing the plurality of statistical values to at least one hardware processor for the purpose of identifying the at least one likely data value according to the plurality of statistical values.

3. The apparatus of claim 2, wherein the at least one processing circuitry comprises telemetry circuitry for collecting at least one of the plurality of statistical values.

4. The apparatus of claim 2, wherein the set of computer instructions comprises at least one monitoring instruction for collecting at least one of the plurality of statistical values.

5. The apparatus of claim 1, wherein the at least one processing circuitry comprises a processing circuitry having a von Neumann architecture.

6. The apparatus of claim 5, wherein the at least one processing circuitry comprises at least one of: a central processing unit, a data processing unit (DPU), a multi-core central processing unit (CPU), a microcontroller unit (MCU) and an accelerated processing unit (ACU).

7. The apparatus of claim 1, wherein the at least one processing circuitry comprises a processing circuitry having a non-von Neumann architecture.

8. The apparatus of claim 7, wherein the at least one processing circuitry comprises at least one of: a data processing unit (DPU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions.

9. The apparatus of claim 1, wherein the at least one processing circuitry comprises a first processing circuitry and a second processing circuitry;
wherein the first processing circuitry is not the second processing circuitry;
wherein executing the at least part of the set of anticipated computer instructions is by the first processing circuitry; and
wherein executing the set of alternative computer instructions is by the second processing circuitry.

10. The apparatus of claim 9, wherein identifying the initial state of the at least one processing circuitry comprises identifying a plurality of state values of the first processing circuitry; and
wherein restoring the initial state of the at least one processing circuitry comprises configuring the second processing circuitry according to the plurality of state values.

11. The apparatus of claim 1, wherein the at least one processing circuitry has a set of supported instructions;
wherein the set of supported instructions comprises a restore instruction for configuring a state of the processing circuitry according to a previously known state of the processing circuitry; and
wherein restoring the initial state of the at least one processing circuitry comprises executing the restore instruction subject to identifying the failed prediction while executing the at least part of the set of anticipated computer instructions.

12. The apparatus of claim 1, wherein the set of anticipated computer instructions is not limited by an amount of branch instructions.

13. The apparatus of claim 1, wherein computing the at least one likely data value is by receiving the at least one value via a digital communication network interface connected to the at least one processing circuitry.

14. The apparatus of claim 1, wherein the at least one likely data value is at least one argument of the at least one of the set of computer instructions of the set of computer instructions.

15. The apparatus of claim 1, wherein the at least one likely data value comprises a range of likely data values.

16. A method for computing, comprising:
identifying an initial state of at least one processing circuitry;
identifying at least one likely data value, where the at least one likely data value is at least one value of at least one of a group of data variables of a set of computer instructions of a software program, the set of computer instructions comprising the at least one group of data variables, anticipated to be computed by executing the set of computer instructions and computed using one or more program data values of the set of computer instructions, where a program data value is a value of a data variable of the program data of the set of computer instructions and where the one or more likely data values are used by at least one of the set of computer instructions when executing the set of computer instructions, wherein computing the at least one likely data value comprises at least one of: applying a unitary Boolean operator to at least one of the one or more program data values, applying an arithmetic operation to two or more of the one or more program data values, and retrieving the at least one value while executing the set of computer instructions from a non-volatile memory component connected to the at least one processing circuitry; and configuring the at least one processing circuitry for:
 executing at least part of a set of anticipated computer instructions produced according to a likely order of execution of the set of computer instructions predicted based on the set of computer instructions and the at least one likely data value; and
 when, while executing the at least part of the set of anticipated computer instructions, identifying a failed prediction where the at least one data variable is not equal to the at least one likely data value according to at least one data variable test:
  restoring the initial state of the at least one processing circuitry; and
  executing one of at least one set of alternative computer instructions, produced based on the set of computer instructions and the at least one likely data value.

17. An apparatus for computing, comprising at least one hardware processor adapted for:
 identifying at least one likely data value, where the at least one likely data value is at least one value of at least one of a group of data variables of a set of computer instructions, anticipated to be computed by executing the set of computer instructions of a software program, the set of computer instructions comprising the at least one group of data variables, the at least one value computed using one or more program data values of the set of computer instructions, where a program data value is a value of a data variable of the program data of the set of computer instructions and where the one or more likely data values are used by at least one of the set of computer instructions when executing the set of computer instructions, wherein computing the at least one likely data value comprises at least one of: applying a unitary Boolean operator to at least one of the one or more program data values, applying an arithmetic operation to two or more of the one or more program data values, and retrieving the at least one value while executing the set of computer instructions from a non-volatile memory component connected to the at least one processing circuitry;
 identifying an initial state of at least one processing circuitry;
 producing a set of anticipated computer instructions and at least one set of alternative computer instructions, produced according to a likely order of execution of the set of computer instructions predicted based on the set of computer instructions and the at least one likely data value; and
 configuring at least one processing circuitry to execute the set of computer instructions by:
  executing at least part of the set of anticipated computer instructions; and
  when, while executing the at least part of the set of anticipated computer instructions, identifying a failed prediction where the at least one data variable is not equal to the at least one likely data value according to at least one data variable test:
   restoring the initial state of the at least one processing circuitry; and
   executing one of the at least one set of alternative computer instructions.

18. The apparatus of claim 17, wherein the at least one hardware processor is further configured for:
 receiving, from at least one other hardware processor, a plurality of statistical values comprising a plurality of data-statistic values indicative of one or more data values of the group of data variables while executing the set of computer instructions and additionally or alternatively at least one branch-statistic value, indicative of a selected instruction executed in response to executing at least one branch instruction of the set of computer instructions; and
 identifying the at least one likely data value according to the plurality of statistical values.

19. The apparatus of claim 17, wherein producing the set of anticipated computer instructions comprises adding to the set of anticipated computer instructions:
 at least one store instruction for storing the initial state of the at least one processing circuitry;
 the at least part of the set of anticipated computer instructions produced based on the set of computer instructions and the at least one likely data value;
 at least one state test instruction for identifying the failed prediction; and
 at least one restore instruction to restore the initial state of the at least one processing circuitry.

20. The apparatus of claim 19, wherein producing the at least part of the set of anticipated computer instructions comprises identifying in the set of computer instructions at least one set of tentative instructions, each associated with at least one local test instruction, such that each set of tentative instructions is anticipated to be executed subject to an outcome of the respective at least one local test instruction associated therewith; and
 wherein the at least one state test instruction is produced according to the at least one local test instruction.

21. The apparatus of claim 18, wherein producing the set of anticipated computer instructions comprises:
 identifying in the set of computer instructions at least one loop of computer instructions;
 identifying, according to the plurality of statistical values, an expected amount of iterations of the loop of computer instructions; and
 generating a rolled-out loop of instructions by repeating at least some of the loop of computer instructions the expected amount of iterations of the loop.

22. The apparatus of claim 21, wherein producing the set of anticipated computer instructions further comprises:
 identifying in the rolled-out loop of instructions a plurality of data-independent operations, where an expected outcome of executing the plurality of data-independent operations does not depend on modifying a runtime value of another of the group of data variables while executing the rolled-out loop of instructions; and
 producing the set of anticipated computer instructions according to the expected outcome.

23. The apparatus of claim 22, wherein producing the set of anticipated computer instructions according to the expected outcome further comprises:

identifying in the rolled-out loop of instructions a plurality of memory access operations to a plurality of vector elements of a vector data variable of the set of computer instructions; and
replacing the plurality of memory access operations with a single equivalent memory operation.

24. The apparatus of claim 18, wherein producing the set of anticipated computer instructions comprises:
producing a first set of anticipated computer instructions according to the expected outcome;
identifying in the first set of anticipated computer instructions a plurality of other data-independent operations, where another expected outcome of executing the plurality of other data-independent operations does not depend on modifying another runtime value of yet another of the group of data variables while executing the first set of anticipated computer instructions; and
producing a second set of anticipated computer instructions according to the other expected outcome.

25. The apparatus of claim 18, wherein producing the set of anticipated computer instructions comprises:
producing another first anticipated set of instructions based on the at least one likely data value;
identifying according to the plurality of statistical values at least one other likely data value, where the at least one other likely data value is at least one other value of at least one other of the group of data variables anticipated while executing the other first anticipated set of instructions; and
producing another second anticipated set of instructions based on the at least one other likely data value.

26. The apparatus of claim 18, wherein configuring the at least one processing circuitry comprises:
computing at least one anticipated data-flow graph according to the set of anticipated computer instructions; and
projecting the at least one data-flow graph onto at least part of the at least one processing circuitry.

27. The apparatus of claim 18, wherein configuring the at least one processing circuitry comprises:
computing at least one alternative data-flow graph according to at least one of the at least one set of alternative computer instructions; and
projecting the at least one alternative data-flow graph onto at least another part of the at least one processing circuitry.

28. A method for computing, comprising:
identifying at least one likely data value, where the at least one likely data value is at least one value of at least one of a group of data variables of a set of computer instructions of a software program, the set of computer instructions comprising the at least one group of data variables, the at least one value anticipated to be computed by executing the set of computer instructions and computed using one or more program data values of the set of computer instructions, where a program data value is a value of a data variable of the program data of the set of computer instructions and where the one or more likely data values are used by at least one of the set of computer instructions when executing the set of computer instructions, wherein computing the at least one likely data value comprises at least one of: applying a unitary Boolean operator to at least one of the one or more program data values, applying an arithmetic operation to two or more of the one or more program data values, and retrieving the at least one value while executing the set of computer instructions from a non-volatile memory component connected to the at least one processing circuitry;
identifying an initial state of at least one processing circuitry;
producing a set of anticipated computer instructions and at least one set of alternative computer instructions, produced according to a likely order of execution of the set of computer instructions predicted based on the set of computer instructions and the at least one likely data value; and
configuring at least one processing circuitry to execute the set of computer instructions by:
executing at least part of the set of anticipated computer instructions; and
when, while executing the at least part of the set of anticipated computer instructions, identifying a failed prediction where the at least one data variable is not equal to the at least one likely data value according to at least one data variable test:
restoring the initial state of the at least one processing circuitry; and executing one of the at least one set of alternative computer instructions.

* * * * *